(12) United States Patent
Benson et al.

(10) Patent No.: US 7,859,199 B1
(45) Date of Patent: Dec. 28, 2010

(54) MAGNETIC CHICANE FOR TERAHERTZ MANAGEMENT

(75) Inventors: Stephen Benson, Yorktown, VA (US); George Herman Biallas, Yorktown, VA (US); David Douglas, Yorktown, VA (US); Kevin Carl Jordan, Newport News, VA (US); George R. Neil, Williamsburg, VA (US); Michele D. Shinn, Newport News, VA (US); Gwyn P. Willams, Yorktown, VA (US)

(73) Assignee: A Jefferson Science Associates, LLC, Newport News, VA (US)

( * ) Notice: Subject to any disclaimer, the term of this patent is extended or adjusted under 35 U.S.C. 154(b) by 829 days.

(21) Appl. No.: 11/880,226

(22) Filed: Jul. 20, 2007

(51) Int. Cl.
*H05H 9/00* (2006.01)

(52) U.S. Cl. .............. 315/505; 372/2; 372/29.022; 250/492.3

(58) Field of Classification Search ......... 315/500–507; 372/2, 29.02, 29.022, 98; 250/492.3, 493.1
See application file for complete search history.

(56) References Cited

U.S. PATENT DOCUMENTS

| 4,287,488 | A | * | 9/1981 | Brau et al. ............... 372/2 |
| 5,130,994 | A | * | 7/1992 | Madey et al. ............. 372/2 |
| 6,636,534 | B2 | * | 10/2003 | Madey et al. ............. 372/2 |
| 6,724,782 | B2 | * | 4/2004 | Hartemann et al. ........ 372/5 |
| 6,782,010 | B2 | * | 8/2004 | Bennett ................... 372/2 |
| 6,844,688 | B1 | * | 1/2005 | Williams et al. .......... 315/505 |

* cited by examiner

*Primary Examiner*—Haissa Philogene

(57) ABSTRACT

The introduction of a magnetic electron beam orbit chicane between the wiggler and the downstream initial bending dipole in an energy recovering Linac alleviates the effects of radiation propagated from the downstream bending dipole that tend to distort the proximate downstream mirror of the optical cavity resonator.

4 Claims, 1 Drawing Sheet

MAGNETIC CHICANE FOR TERAHERTZ MANAGEMENT

The United States of America may have certain rights to this invention under Management and Operating Contract DE-AC05-060R23177 from the United States Department of Energy.

FIELD OF THE INVENTION

The present invention relates to the management of terahertz (THz) radiation and more particularly to the use of a magnetic chicane to achieve such management.

BACKGROUND OF THE INVENTION

Conventional Energy Recovering Linac (ERL)-based Free Electron Lasers (FELs) employing optical cavity resonators use a combination of off-crest acceleration and magnetic bunching to produce the high peak currents required for FEL operation. This imposes on the system a requirement for merging and separating the drive electron beam and the FEL optical mode. This is typically done with a topology as shown in attached FIG. 1 wherein the final dipole of the upstream magnetic recirculator/bunching system is the site of the final bunch length compression. Subsequent transport to a light-producing wiggler magnet 12 may (though is not necessarily will) is used to adjust transverse electron drive beam 16 properties, but does not influence bunch length. In FIG. 1, an injected electron drive beam 16 is injected into linear accelerator 18 to produce an accelerated electron beam 20.

After passage through wiggler 12, the transport system again may (though not necessarily will) be used to adjust electron drive beam 16 transverse properties, but the electron bunch remains longitudinally short until it reaches the first bending magnet 24 of the energy recovery recirculation/energy compression system of the ERL.

In this system topology, the system geometric footprint is dominated by the optical cavity length D; in the prior art, the final magnetic bending dipole 10 upstream of wiggler 12 and initial bending dipole 24 downstream of wiggler 12 are spatially adjacent to the mirrors 26 and 28 that define the optical cavity 30.

In addition to producing coherent radiation via interaction with wiggler 12 magnetic fields, the tightly bunched electron beam used in high power FELs also produces coherent synchrotron radiation (CSR) in the THz spectral regime via its interaction with the bending fields in magnetic dipoles 10 and 24. The CSR radiation from dipole 10 onward propagates down the vacuum system, and poses little operational impediment, but the radiation from dipole 24 onward propagates onto adjacent downstream mirror 28 of optical cavity 30. The resultant radiation power load can be in excess of tens or hundreds of Watts, is of asymmetric distribution on mirror 28, and is largely absorbed by many of the materials used for such mirrors. This leads to thermal distortion of mirror 28, rendering it astigmatic and consequently limiting the power that can be generated by and extracted from the FEL.

There thus remains a need to control or eliminate the radiation from dipole 24 onward that propagates onto adjacent downstream mirror 28 of optical cavity 30.

OBJECT OF THE INVENTION

It is therefore an object of the present invention to provide a mechanism that controls or eliminates radiation from the initial magnetic dipole onward that propagates onto adjacent downstream mirror 28 of optical cavity 30.

SUMMARY OF THE INVENTION

The introduction of a magnetic electron beam orbit chicane between the wiggler and the downstream initial bending dipole of an energy recovering Linac alleviates the effects of radiation propagated from the downstream bending dipole that tend to distort the proximate downstream mirror of the optical cavity resonator.

DETAILED DESCRIPTION

Figure 2:
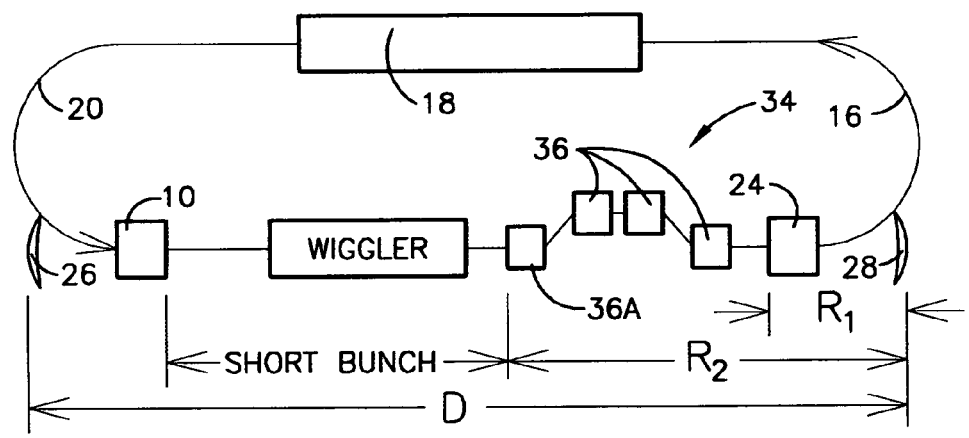
FIG. 2 is a schematic representation of an energy resolving Linac incorporating a THz radiation management system in accordance with the present invention.

We have determined that the introduction of a magnetic electron beam orbit chicane 24 between wiggler 12 and downstream initial bending dipole 24/downstream mirror 28 alleviates the effect of propagated radiation distorting downstream mirror 28. Such a chicane 34 is shown schematically in FIG. 2; it can consist either of four similar dipoles 36 (as depicted) or of a generic symmetric three-dipole chicane bending through angles $\alpha$, $-2\alpha$, and $\alpha$, or of any other appropriate beamline design geometry. The only fundamental requirements are: a) that the "chicane" (or any other beam transport system) bend the short electron bunch away from the optical mode, i.e. downstream mirror 28 at a distance well displaced from downstream mirror 28, and b) that the subsequent electron beam transport possess a significant momentum compaction at any downstream point in proximity to downstream mirror 28.

Figure 1:
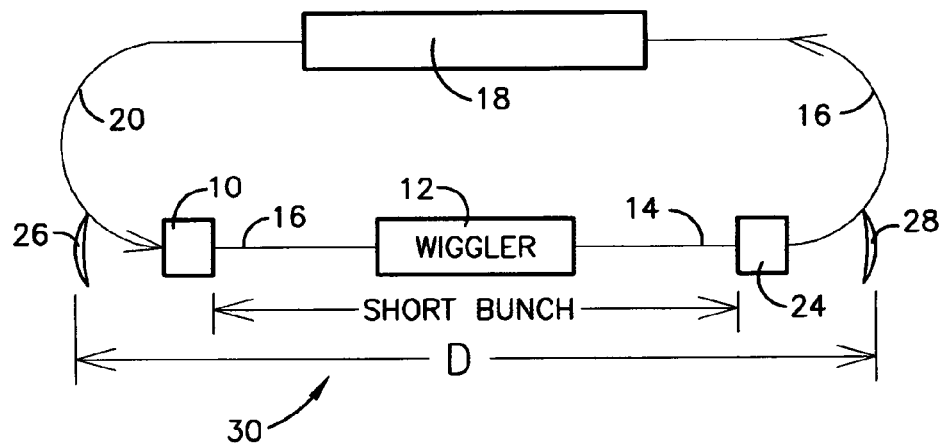
FIG. 1 is a schematic representation of a conventional energy resolving Linac in accordance with the prior art.

With the chicane in place, the bunch is short at the first dipole 36A of the chicane system 34, and CSR radiation is thus produced at this location. This radiation is, however, 1) directed away from, and thus displaced in transverse position by the time it forward propagates to the location of downstream mirror 28, 2) suppressed in intensity by $1/r^2$ ($r=r_2/r_1$, where $r_2$ the dipole 36A to mirror 28 separation and $r_1$ the dipole 24 to mirror 28 separation) at mirror 28, relative to its power density in the prior art topology shown in FIG. 1, and 3) transport through the remainder of the chicane significantly increases the electron bunch length (by virtue of the momentum compaction of the chicane), thereby dramatically suppressing CSR production at initial bending dipole 24.

As a consequence of these palliative measures, the THz thermal loading of downstream mirror 28 is dramatically alleviated, mirror distortion reduced, and FEL power is significantly enhanced. We note that the farther the initial bend at dipole 36 is from downstream mirror 28, the better the suppression will be. Again, the geometry need not be that of a classic "magnetic chicane", it need only bend the beam away from the optical cavity 30 axis, thereby directing the THz radiation away from mirror 28, and should supply momentum compaction to the wiggler-to-energy recovery transport, so that the bunch is not short when it is in spatial or temporal proximity to downstream mirror 28 or in any magnetic bending dipole 24 adjacent or in proximity to downstream mirror 28.

Magnetic chicanes have generally benign and well understood transverse and longitudinal focusing properties, and are thus readily integrated with both preexisting wiggler-to-energy recovery system transport systems and the transverse and longitudinal matching manipulations used in the energy recovery/energy compression systems of typical ERLs. The orientation of the chicane is not constrained; either horizontal or vertical bending can be used, as can, in principle, out-of-principal-plane bending or any other realizable combination of bend orientations provided that other system constraints are appropriately satisfied.

There has thus been described a method and apparatus that alleviate the effects of radiation emitted by initial bending dipole 24 that might otherwise be propagated onto adjacent downstream mirror 28 of optical cavity 30.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for the alleviation of the effects of radiation propagated from an initial bending dipole to the downstream mirror of an energy recovering linac that includes an optical cavity comprising a pair of opposed upstream and downstream mirrors, an initial bending dipole and a wiggler upstream of the initial bending dipole, said method comprising: introducing between the wiggler and the initial bending dipole a mechanism that: a) bends a beam away from the optical cavity axis, thereby directing radiation produced by the initial bending dipole away from the downstream mirror; and b) supplies momentum compaction to the wiggler-to-energy recovery transport.

2. The method of claim 1 wherein said mechanism comprises an electron beam orbit magnetic chicane.

3. An energy recovering linac comprising a final bending dipole, a wiggler, an initial bending dipole and an optical cavity comprising a pair of opposed upstream and downstream mirrors and further including between the wiggler and the initial bending dipole, a mechanism that: a) bends a beam away from the optical cavity axis, thereby directing radiation produced by the initial bending dipole away from the downstream mirror; and b) supplies momentum compaction to the wiggler-to-energy recovery transport.

4. The energy recovering linac of claim 3 wherein said mechanism comprises an electron beam orbit magnetic chicane.

\* \* \* \* \*